United States Patent
Cui et al.

(10) Patent No.: US 8,552,110 B2
(45) Date of Patent: Oct. 8, 2013

(54) POLYMERIZATION PROCESS FOR PREPARING MONODISPERSAL ORGANIC/INORGANIC COMPOSITE NANO-MICROSPHERE

(75) Inventors: Longlan Cui, Shanghai (CN); Hong Xu, Shanghai (CN); Hongchen Gu, Shanghai (CN)

(73) Assignee: Shanghai Allrun Nano Science and Technology Co., Ltd., Shanghai (CN)

( * ) Notice: Subject to any disclaimer, the term of this patent is extended or adjusted under 35 U.S.C. 154(b) by 756 days.

(21) Appl. No.: 12/160,802

(22) PCT Filed: Jan. 11, 2007

(86) PCT No.: PCT/CN2007/000107
§ 371 (c)(1),
(2), (4) Date: Jul. 30, 2010

(87) PCT Pub. No.: WO2007/079690
PCT Pub. Date: Jul. 19, 2007

(65) Prior Publication Data
US 2010/0292388 A1   Nov. 18, 2010

(30) Foreign Application Priority Data
Jan. 12, 2006   (CN) .......................... 2006 1 0023218

(51) Int. Cl.
*C08K 13/02* (2006.01)
*C08K 3/00* (2006.01)

(52) U.S. Cl.
USPC ........... 524/849; 524/800; 524/501; 977/773; 977/774; 977/778; 977/779; 977/827; 977/830

(58) Field of Classification Search
USPC .......... 524/501, 800, 849; 977/773, 774, 778, 977/779, 827, 830
See application file for complete search history.

(56) References Cited

FOREIGN PATENT DOCUMENTS

| CN | 1556123 A | 12/2004 |
|---|---|---|
| CN | 1654489 A * | 8/2005 |

OTHER PUBLICATIONS

CN 16454489A, Aug. 2005, Machine translation.*
Ramírez et al. "Magnetic Polystyrene Nanoparticles with a High Magnetite Content Obtained by Miniemulsion Process." Macromolecular Chemistry and Physics, vol. 204, No. 1, 2003, pp. 23-31.

* cited by examiner

*Primary Examiner* — Satya Sastri
(74) *Attorney, Agent, or Firm* — Hamre, Schumann, Mueller & Larson, P.C.

(57) ABSTRACT

Polymerization process for preparing mono-disperse organic/inorganic nanocomposite microspheres in the field of nano technology is disclosed. The process comprises preparing of two different miniemulsion systems of A with inorganic nanoparticles and B with polymeric monomers in advance; adding water-soluble initiator into miniemulsion A, stirring till complete dissolution finally, heating the mixed system to a given temperature for isothermal reaction. The grain size of the as-prepared superparamagnetic $Fe_3O_4$/polystyrene using to present invention is homogeneous and controllable, and the magnetic particles content is controllable.

9 Claims, 1 Drawing Sheet

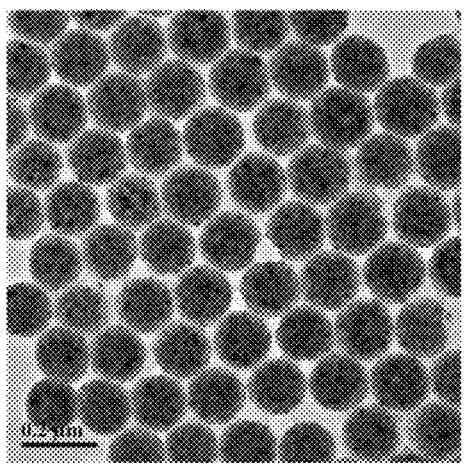

POLYMERIZATION PROCESS FOR PREPARING MONODISPERSAL ORGANIC/INORGANIC COMPOSITE NANO-MICROSPHERE

FIELD OF THE INVENTION

The present invention relates to the field of nano-technology processes. In particular, the present invention relates to a polymerization process for preparing mono-dispersed organic/inorganic nanocomposite microspheres.

BACKGROUND OF THE INVENTION

The people are making great efforts to develop the preparation of a unique material, i.e. organic/inorganic nanocomposite microspheres, and in particular, the magnetic composite microsphere is drawing the attentions of developers for its potential applications in biology. The methods generally used to prepare the inorganic/organic composite nano-microspheres include: suspension polymerization, dispersion polymerization, emulsion polymerization, miniemulsion polymerization and the like. The suspension polymerization and dispersion polymerization can produce composite microspheres particles with larger particle size but also relatively wider particle size distribution; as to the typical emulsion polymerization, the composition degree of the particles tends to degrade and the contents of the inorganic dispersed phase will be inhomogeneous due to the limitation in the polymerization mechanism thereof; miniemulsion polymerization is a preferable process for preparing inorganic/organic composite microspheres, however, the miniemulsification process can not achieve a substantial mono-dispersed miniemulsion, therefore the microspheres thus prepared are of uneven particle size distribution, and it's hard to increase the amount of inorganic particles in the microspheres.

After searching the literatures of the prior art, we find that the magnetic particles content in the magnetic polymer nanocomposite microspheres prepared by conventional methods such as dispersion polymerization, emulsion polymerization, suspension polymerization, etc. is not more than 35 wt %. A three-step process for preparing composite microsphere with high magnetic particles content is disclosed in "Magnetic Polystyrene Nanoparticles with a High Magnetite Content Obtained by Miniemulsion Processes", *Macromolecular Chemistry and Physics* 2003. 204. 22-31, developed by Lilliana P. Ramirez and Katharina Landfester, etc., thereby the magnetic particles content in magnetic polystyrene is increased to 40 wt %. However, the magnetic polystyrene microspheres produced by this three-step miniemulsion polymerization have wide particle size distribution and do not exhibit excellent morphology.

SUMMARY OF THE INVENTION

In order to overcome the shortcomings of the prior art, the present invention provides a polymerization process for preparing mono-dispersed organic/inorganic composite nano-microspheres, namely double miniemulsion system emulsion polymerization method, which can produce mono-dispersed inorganic/organic nanocomposite microspheres with high magnetic particles content. The process of composition is an in-situ polymerization in the presence of inorganic nanoparticles. Any inorganic nanoparticles can be used for the preparation of the composite microspheres, as long as they can be uniformly dispersed throughout the organic dispersed phase after modification.

The present invention is practised as follow: two different miniemulsion systems are produced in advance: a miniemulsion system A comprising inorganic nanoparticles and a miniemulsion system B comprising polymeric monomers. Free radical initiator is added into the miniemulsion A, and the resultant content is stirred in advance until the initiator has dissolved in the aqueous phase, then the miniemulsion system B is added thereto, followed by stirring until the whole system is homogeneous. The system mixed as such is transferred to an isothermal water bath for reaction.

In the following description, a further disclosure will be made to the present, which comprises three steps:

(1) The inorganic nanoparticles modified with surfactant are dispersed in an organic solvent, then they are used as oil phase to mix with water and surfactants, and the mixture obtained is treated with ultrasonic wave to form an o/w miniemulsion A. The power of ultrasonic wave can be varied to in the range of 200~800 W, thus the oil droplets of the dispersed phase comprising inorganic nanoparticles can be prepared controllably.

(2) Water and surfactants of the same kind are confected into a 0.1-0.2 wt % aqueous solution. The polymeric monomers are extruded from a SPG membrane emulsificator to produce a homogeneous miniemulsion B. In this system, the polymeric monomers form micron-sized mono-dispersed oil droplets in the aqueous phase.

(3) It must be assured that no free micelle is present in the system of miniemulsion A and miniemulsion B. Free radical polymeric initiator is added and stirred to resolve in miniemulsion A, followed by the addition of miniemulsion B and stirring for 0.5 hour, then the resultant content is transferred to a isothermal water bath of 50~85° C. to react for more than 5 hours.

The difference of the diameter of the oil-droplets of dispersed phase between the pre-produced systems of miniemulsion A and miniemulsion B is at least one order of magnitude, and preferably $10^4$. The diameter of the oil-droplets of dispersed phase in the miniemulsion A system comprising inorganic particles is in the range of 50~200 nm, while the diameter of the monomers droplets of dispersed phase in the miniemulsion B system is larger than 1 μm.

The inorganic nanoparticles can be selected from one or more of the group consisting of $Fe_3O_4$, Fe—Co alloy, nano-crystal of metal, nano-crystal of semiconductor and $Fe_2O_3$.

The polymeric monomers can be, homopolymerized or copolymerized, styrene and methyl methacrylate.

The surfactants used for the preparing of double-miniemulsion system is one of the sodium dodecyl sulfate (SDS), Tween 20.

The surfactant used for the modification of the inorganic nanoparticles is selected from either or both of oleic acid and undecylenic acid.

The organic solvent is one of n-octane and n-hexane.

The initiator is one of potassium persulfate (KPS), azodi-isobutyronitrile (AIBN), benzoyl peroxide (BPO).

The present invention is to resolve the problems of the low contents of inorganic particles and uneven dispersion state of microspheres in the production of organic/inorganic composite microsphere, and by providing a unique preparation process, the present inventors overcome the long-term existing limits of the ordinary polymerization process, i.e. the inorganic particles tend to conglomerate during the polymerization of monomers, low degree of composition, and low controllability of the system. The present invention takes advantage of the stabilization effect of miniemulsion and the polymerization mechanism of emulsion polymerization. The monomer droplets in the miniemulsion A which comprises inorganic nanoparticles are the main nucleation site due to their large quantity and large surface area, which is similar with the micelle in the emulsion polymerization; the micro-sized monomer droplets in the miniemulsion B act as the supplier of monomer to continuously provide monomers to the nucleating micelle, which is similar with the monomer droplets in the emulsion polymerization. The polymerization mechanism disclosed above takes advantage of the convenience of forming mono-dispersed microspheres by emulsion polymerization, meanwhile miniemulsion droplets are used to avoid the shortcoming that micelle nucleation is not suitable for preparing the inorganic/organic composite microsphere, which provides a mono-dispersed inorganic/organic composite microspheres with high magnetic particles content. The present invention is mainly used for the preparation of inorganic/organic composite nano-material comprising two-phase or multi-phase components.

DESCRIPTION OF THE DRAWINGS

FIG. 1 is a picture of the $Fe_3O_4$/PS magnetic nanocomposite microspheres prepared according to the present invention.

DETAILED DESCRIPTION OF THE PRESENT INVENTION

The following examples are suggested according to the technical solution of the present invention:

Example 1

The Preparation of Mono-Dispersed Magnetic Polystyrene Composite Microspheres with High Magnetic Particles Content (95 Wt %)

1. The Preparation and Surface Modification of $Fe_3O_4$ Magnetic Nanoparticles and the Preparation of $Fe_3O_4$-Octane Dispersion The magnetic $Fe_3O_4$ nanoparticles co-modified with oleic acid and undecylenic acid were prepared by coprecipitation. 26 g $Fe_3Cl.7H_2O$ and 18 g $Fe_2SO_4.7H_2O$ were dissolved in 50 ml of de-ionized (DI) water, and the contents obtained were poured into a three-necked flask after fully dissolution, and then transferred to a water bath of 70° C. and purged with nitrogen, after being mixed at 400 rpm for 0.5 hour, 50 ml of ammonia liquor was added into the reaction system and started to react. A mixture (5 g) of oleic acid and undecylenic acid (oleic acid:undecylenic acid=2:3) was added thereto after 5 minutes. One hour later, the temperature of water bath raised to 90° C. and was kept constant for one hour, by which the ammonia liquor was totally evaporated to terminate the reaction. The resultant magnetic particles were washed respectively with water and absolute ethanol, each for 3 times, to obtain a $Fe_3O_4$-octane dispersion with the magnetic particles content of 50%.

2. The Preparation of Miniemulsion A 0.02 g of SDS, 48 g of DI water and 2 g of $Fe_3O_4$-octane dispersion with the magnetic particles content of 50% was treated with ultrasonic wave under the power of 800 W for 30 minutes to obtain a miniemulsion A with a average particle size of 129 nm.

3. The Preparation of Miniemulsion B 5 g of styrene and 0.08 g of cetane was uniformly mixed and added into a SPG membrane-emulsificator, and then they were extruded into a continuous phase comprising 0.10 g of SDS and 80 g of DI water under the pressure of 0.048 Mpa, thus obtained a miniemulsion B with monomer droplets therein, of which the average particle size was 5.126 µm.

4. Polymerization 20 mg of potassium persulfate was added into the magnetic miniemulsion A as initiator and mechanically stirred at 500 rpm for 0.5 hour, then the miniemulsion B was poured into miniemulsion A and the revolution rate was adjusted to 200 rpm, and then the content was transferred into a water bath of 78° C. to polymerize for 17 hours, and obtained mono-dispersed magnetic nanocomposite microspheres with the average particle size of 169.4 nm, which are illustrated in FIG. 1.

Example 2

The Preparation of Mono-Dispersed Magnetic Polymethyl Methacrylate Nanocomposite Microspheres with Low Magnetic Particles Content 1. The Preparation and Surface Modification of $Fe_3O_4$ Magnetic Nanoparticles and the Preparation of $Fe_3O_4$-Octane Dispersion The preparation of magnetic nanoparticles was the same with the one disclosed in Example 1-1. The magnetic nanoparticles co-modified with oleic acid and undecylenic acid were washed repeatedly with water and absolute ethanol, followed by dispersed in n-octane to obtain a $Fe_3O_4$-octane ferrofluid with the magnetic particles content of 10 wt %.

2. The Preparation of Miniemulsion A 0.12 g of SDS (sodium dodecyl sulfate), 48 g of DI water and 2 g of $Fe_3O_4$-octane dispersion with the magnetic content of 10% was treated by ultrasonic wave under the power of 200 W for 10 minutes to obtain a miniemulsion A with a average particle size of 200 nm.

3. The Preparation of Miniemulsion B 5 g of methyl methacrylate and 0.08 g of cetane was uniformly mixed and added into a SPG membrane-emulsificator, and then they were extruded into a continuous phase comprising 0.10 g of SDS and 80 g of DI water under the pressure of 0.048 Mpa, thus obtained a miniemulsion B with monomer droplets therein, of which the average particle size was 4.923 µm.

4. Polymerization 20 mg of potassium persulfate was added into the magnetic miniemulsion A as initiator and mechanically stirred at 500 rpm for 0.5 hour, then the miniemulsion B was poured into miniemulsion A and the revolution rate was adjusted to 200 rpm, and then the content was transferred into a water bath of 50° C. to polymerize for 17 hours, and obtained composite particles with the average particle size of 280 nm.

Example 3

The Preparation of Magnetic Nanocomposite Microspheres Labeled by Quantum Dots

The magnetic particles were prepared and surface-modified as disclosed in Example 1, with the difference was that the magnetic particles content of the $Fe_3O_4$-octane dispersion was 30%. The preparation of miniemulsion A and miniemulsion B was also the same as Example 1, with the differences was that the ultrasonication power used for the preparation of miniemulsion (A) was 500 W, and the average particle size of miniemulsion (A) was 155 nm. The miniemulsion A was poured into a three-neck flask and 0.5 g of octane dispersion containing quantum dots (CdSe modified by TOPO) was added therein. The content was stirred at 500 rpm for 1 hour, followed by the addition of the initiator of azodiisobutyronitrile, and then miniemulsion B was poured into the three-neck flask to combine with miniemulsion A, and the resultant content was transferred to a water bath of 65° C. to polymerize for 5 hours, thus magnetic nanocomposite microspheres doped with CdSe with the is average particle size of 230 nm were obtained.

Example 4

The Preparation of FeCo/PS Magnetic Nanocomposite Microspheres

The nano-alloy of FeCo was prepared by high temperature organic solvent process and was dispersed in n-hexane to produce a ferrofluid with the magnetic particles content of 5 wt %. The preparation method and the procedures of polymerization were the same with Example 1, with the differences were that FeCo ferrofluid of 5 wt % was used in place of the $Fe_3O_4$ ferrofluid of 50 wt %, the initiator was benzoyl peroxide, and the temperature of polymerization was 85° C. The average particle size of the resultant magnetic nanocomposite microspheres was 157 nm.

The invention claimed is:

1. A polymerization process for preparing mono-dispersed organic/inorganic nanocomposite microspheres, the process comprising:
    preparing two different miniemulsion systems: miniemulsion system A comprising inorganic nanoparticles and miniemulsion system B comprising polymerizable monomers suitable for polymerization;
    adding a water-soluble initiator into the miniemulsion system A, stirring until the initiator is dissolved in an aqueous phase, then adding the miniemulsion system B thereto and stirring until the systems are mixed uniformly; and
    transferring the mixed system to an isothermal water bath for reaction.

2. The polymerization process for preparing mono-dispersed organic/inorganic nanocomposite microspheres of claim 1, wherein:
    (1) preparing the miniemulsion system A includes modifying the inorganic nanoparticles with a first surfactant, dispersing the modified inorganic nanoparticles in an organic solvent to form a dispersion, using the resultant dispersion as an oil phase to mix with water and a second surfactant to obtain a mixture, and treating the obtained mixture with an ultrasonic wave to form the miniemulsion system A, wherein the second surfactant is capable of preparing a double miniemulsion system including the miniemulsion system A and the miniemulsion system B, wherein the miniemulsion system A is an o/w miniemulsion system and includes oil droplets in a dispersed phase including the inorganic nanoparticles, and wherein the power of the ultrasonic wave is varied in the range of 200~800 W,
    (2) preparing the miniemulsion system B includes mixing water and the second surfactant to form a 0.1-0.2 wt % aqueous solution, extruding the polymerizable monomers from a membrane emulsificator into the aqueous solution to produce an homogeneous miniemulsion system B, wherein the polymerizable monomers form micron-sized mono-dispersed oil droplets in an aqueous phase,
    (3) assuring that no free micelle is present in the miniemulsion system A and the miniemulsion system B, then adding the initiator that is a free radical polymeric initiator and stirring until the initiator is dissolved in the miniemulsion system A, then adding the miniemulsion system B and stirring for 0.5 hour, transferring the resultant content to a isothermal water bath of 50~85° C. to react for more than 5 hours.

3. The polymerization process for preparing mono-dispersed organic/inorganic nanocomposite microspheres of claim 1, wherein the difference of the diameter of the oil droplets of dispersed phase between the systems of the miniemulsion system A and the miniemulsion system B is at least one order of magnitude, the diameter of the oil droplets of dispersed phase in the miniemulsion system A comprising inorganic particles is in the range of 50~200 nm, while the diameter of the monomer drops of dispersed phase in the miniemulsion system B is larger than 1 μm.

4. The polymerization process for preparing mono-dispersed organic/inorganic nanocomposite microspheres of claim 1, wherein the inorganic nanoparticles are selected from one or more of the group consisting of $Fe_3O_4$, Fe—Co alloy, nano-crystal of metal, nano-crystal of semiconductor, $Fe_2O_3$ and combination thereof.

5. The polymerization process for preparing mono-dispersed organic/inorganic nanocomposite microspheres of claim 1, wherein the polymerizable monomers are selected from the group consisting of homopolymerized or copolymerized styrene, homopolymerized or copolymerized methyl methacrylate and combination thereof.

6. The polymerization process for preparing mono-dispersed organic/inorganic nanocomposite microspheres of claim 2, wherein the second surfactant used for preparing of the double-miniemulsion system is sodium dodecyl sulfate, or Tween 20.

7. The polymerization process for preparing mono-dispersed organic/inorganic nanocomposite microspheres of claim 2, wherein the surfactant used for the modification of the inorganic nanoparticles is selected from the group consisting of oleic acid, undecylenic acid and combination thereof.

8. The polymerization process for preparing mono-dispersed organic/inorganic nanocomposite microspheres of claim 2, wherein the organic solvent is n-octane or n-hexane.

9. The polymerization process for preparing mono-dispersed organic/inorganic nanocomposite microspheres of claim 1, wherein the initiator is potassium persulfate, azodiisobutyronitrile, or benzoyl peroxide.

* * * * *